No. 626,031. Patented May 30, 1899.
J. W. OSBORNE.
ART OF AND APPARATUS FOR MAKING READY FORMS FOR PRINTING.
(Application filed July 3, 1896.)
(No Model.) 7 Sheets—Sheet 1.
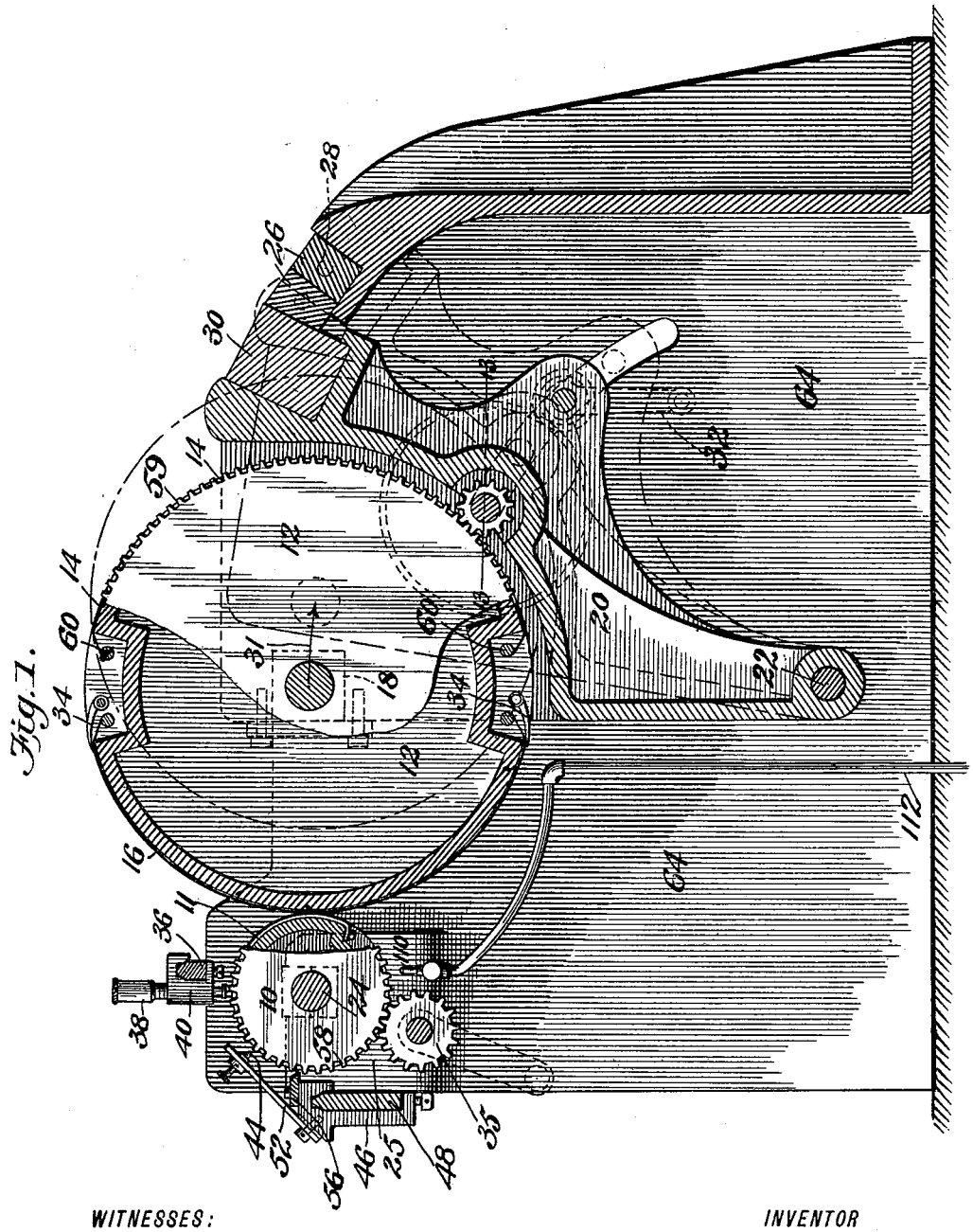
WITNESSES: INVENTOR No. 626,031. Patented May 30, 1899.
J. W. OSBORNE.
ART OF AND APPARATUS FOR MAKING READY FORMS FOR PRINTING.
(Application filed July 3, 1896.)
(No Model.) 7 Sheets—Sheet 2.
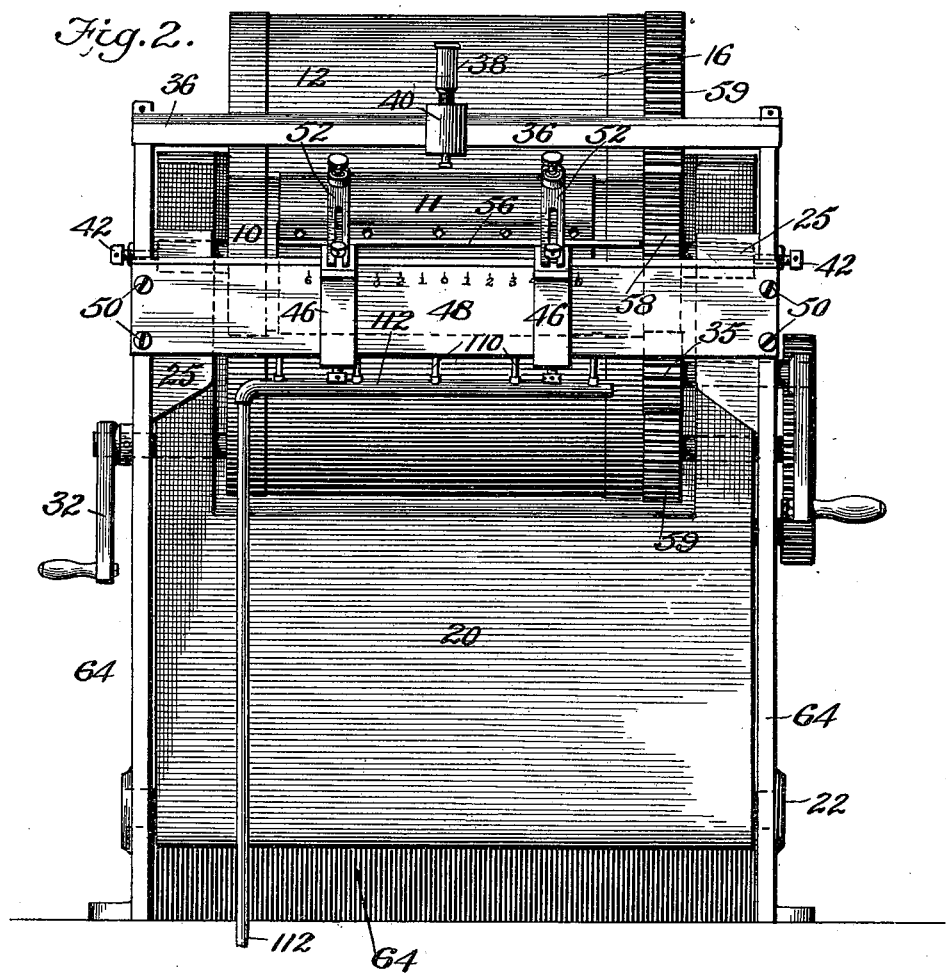
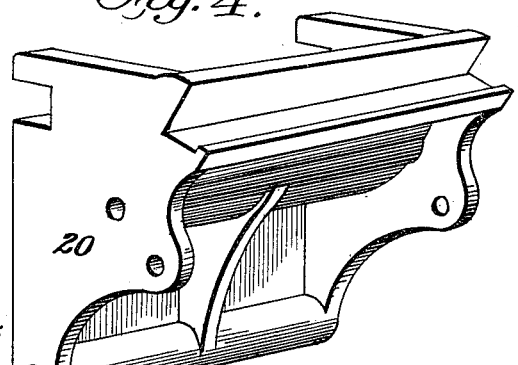
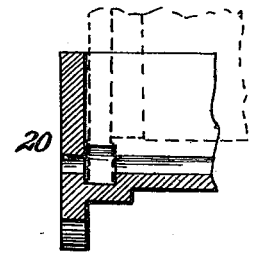
WITNESSES: INVENTOR
John W. Osborne No. 626,031. Patented May 30, 1899.
J. W. OSBORNE.
ART OF AND APPARATUS FOR MAKING READY FORMS FOR PRINTING.
(Application filed July 3, 1896.)
(No Model.) 7 Sheets—Sheet 3.
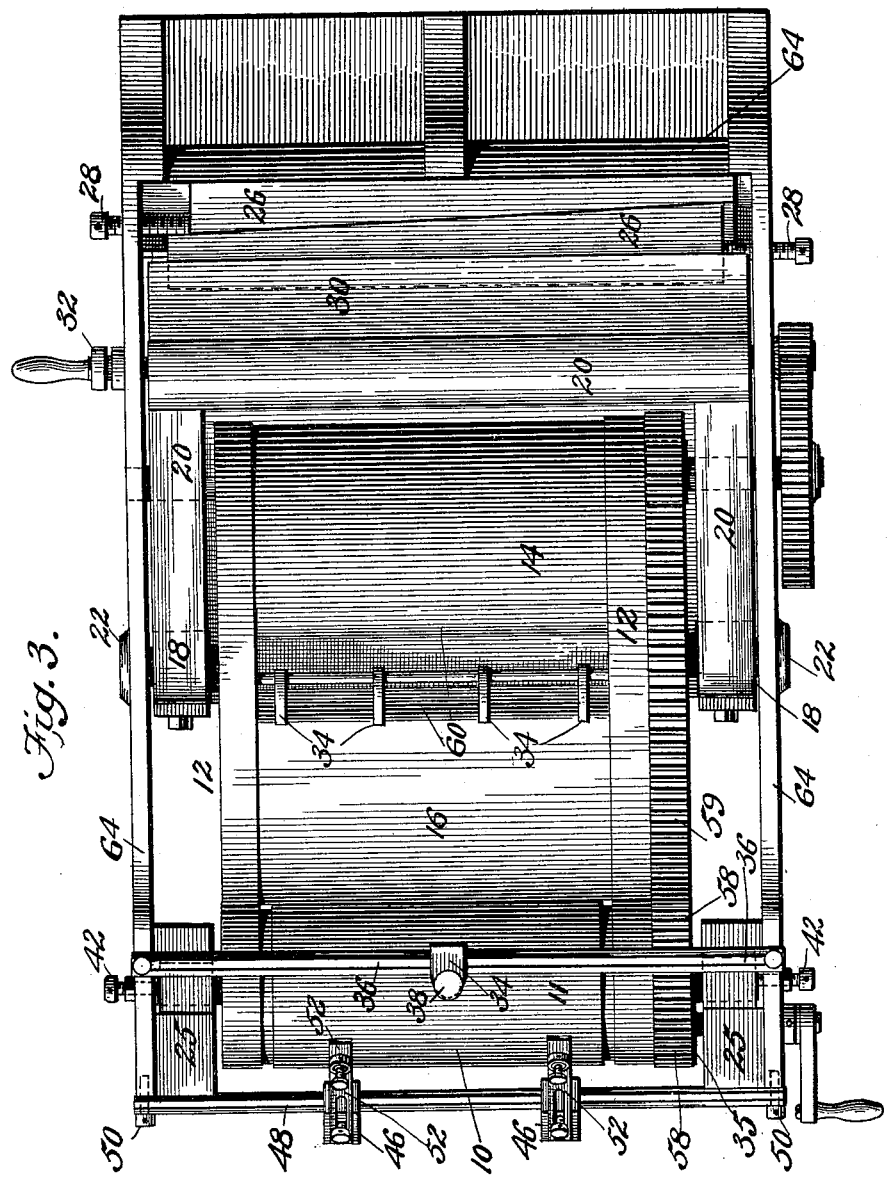
WITNESSES: INVENTOR

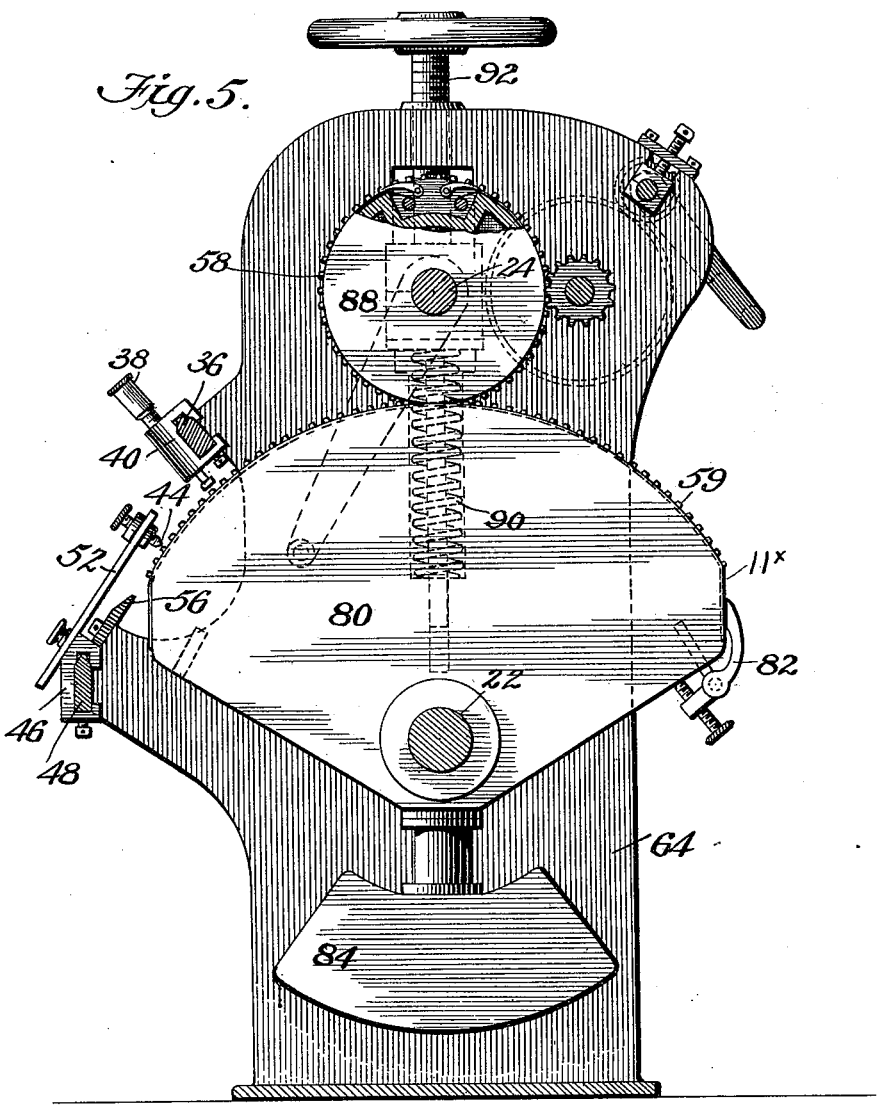

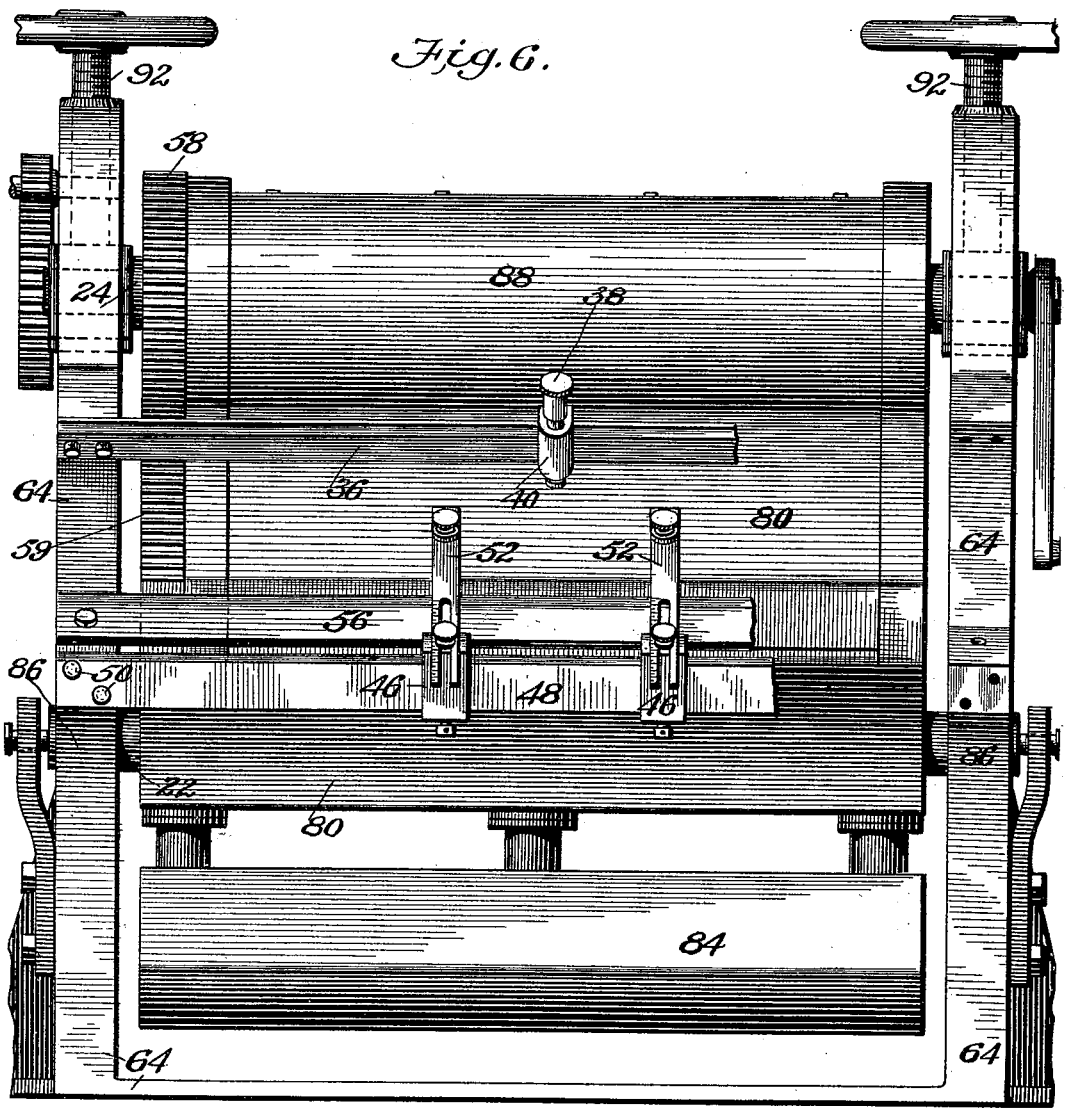

No. 626,031. Patented May 30, 1899.
J. W. OSBORNE.
ART OF AND APPARATUS FOR MAKING READY FORMS FOR PRINTING.
(Application filed July 3, 1896.)
(No Model.) 7 Sheets—Sheet 6.

WITNESSES:
M. D. Blondel
C. Osborne

INVENTOR
John W. Osborne

No. 626,031. Patented May 30, 1899.
J. W. OSBORNE.
ART OF AND APPARATUS FOR MAKING READY FORMS FOR PRINTING.
(Application filed July 3, 1896.)
(No Model.) 7 Sheets—Sheet 7.

WITNESSES:
M. S. Blondel
Chas. K. Davies.

INVENTOR
J. W. Osborne
BY W. H. Bartlett
ATTORNEY.

UNITED STATES PATENT OFFICE.

JOHN W. OSBORNE, OF WASHINGTON, DISTRICT OF COLUMBIA.

ART OF AND APPARATUS FOR MAKING READY FORMS FOR PRINTING.

SPECIFICATION forming part of Letters Patent No. 626,031, dated May 30, 1899.

Application filed July 3, 1896. Serial No. 597,965. (No model.)

*To all whom it may concern:*

Be it known that I, JOHN W. OSBORNE, a subject of the Queen of Great Britain, and a resident of Washington, in the District of Columbia, have invented an Improvement in the Art of Making Ready Forms for Printing and in Apparatus Therefor, of which the following is a specification.

This invention is related to the ordinary operation of "making ready" in the printer's meaning of the expression. My ultimate object is like his—namely, to get the best possible result from a form; but the details of my process differ from those practiced by him inasmuch as my work is accomplished out of the printing-press and with the help of apparatus independent thereof and especially adapted for the one purpose, whereas the press he uses is designed especially for printing, which also involves feeding, inking, and the delivery of paper, and incidentally only the process of under or over laying which hitherto could be done nowhere else. It will accordingly be found that in my apparatus the hindrances and inconveniences met with in the printing-press are avoided or minimized, while, on the other hand, means for making exact measurements, corrections, and records are supplied which facilitate the work very much.

My invention is peculiarly fitted for making ready the forms used in multicolor printing when the same are attached to the surface of one or more cylinders, and in the following description I shall assume for the most part having to deal with such forms, as they best illustrate the scope of my invention.

Figure 8:
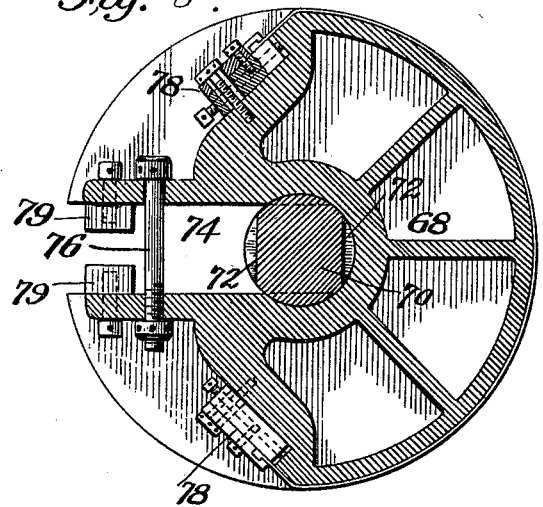
Figure 9:
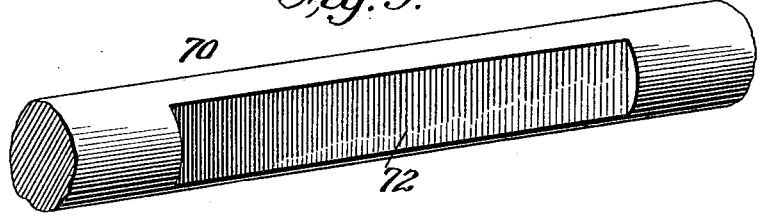
Figure 7:
Figure 11:
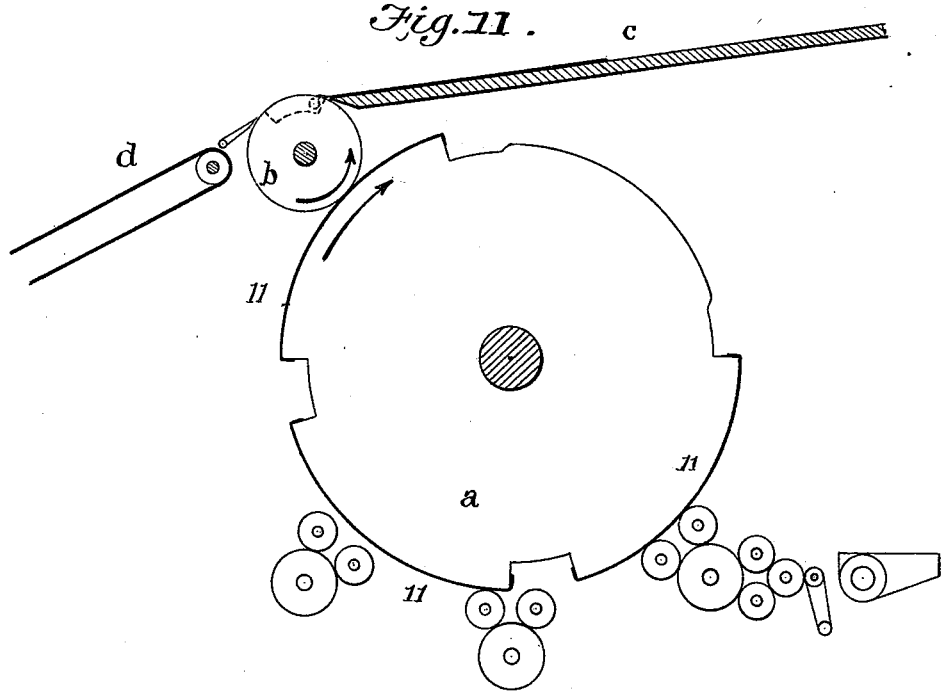
Figure 12:
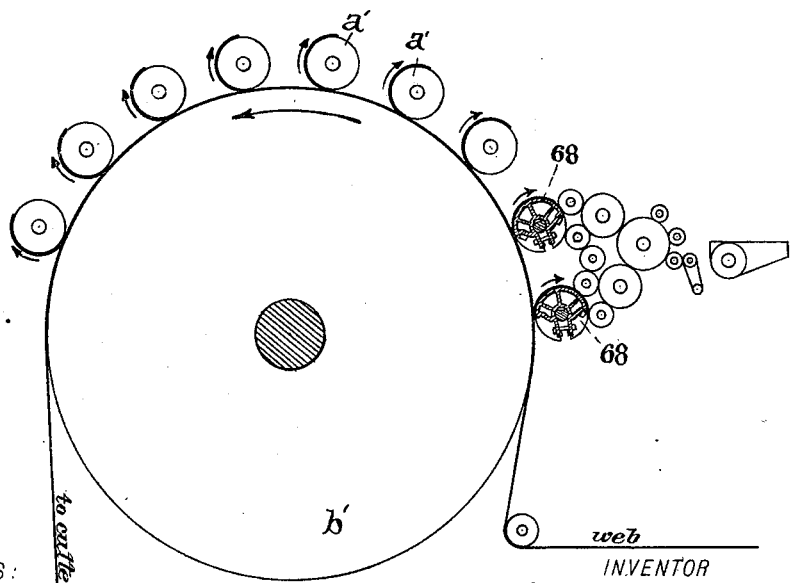

In the accompanying drawings, Figure 1 is a side elevation and section in part of a small-cylinder apparatus. Fig. 2 is a front view of the foregoing, and Fig. 3 a plan of it. Fig. 4 shows in perspective a view of an inner piece of framing isolated from other details. Fig. 5 is a side elevation and partial section of a large-cylinder apparatus. Fig. 6 shows the same in front elevation. Fig. 7 shows end views of open sleeves adapted to act as form-supports; Fig. 8, a cross-section of a modified cylinder; Fig. 9, a perspective of a form of cylinder-axle; Fig. 10, a detail section on line 13, Fig. 1. Fig. 11 is an end elevation of enough of the working mechanism of a printing-press to indicate the general relation of the working parts and showing the general character of one form of press on which the forms made ready by the mechanism before illustrated may be used for printing. Fig. 12 is a similar view of another form of press. Fig. 13 is a section or outline diagram, showing a three-color three-form cylinder $a$, an impression-cylinder $b$, feed-board $c$, delivery apparatus $d$, and enough of the mechanism to enable an expert in this art to understand the general relation of parts. The form-plates 11 of Fig. 5 may be applied to such a cylinder. Fig. 14 indicates diagrammatically another form of multicolor press, with $a'$ $a'$ or 68 68 indicating the form-cylinders and $b'$ the impression-cylinder. Only a small part of the working mechanism is shown, such being deemed sufficient to show the relation of the cylinders 68 to the working mechanism of a printing-press. The cylinders $a'$ $a'$ can of course be like those indicated at 68 as to their adaptability for making ready in the make-ready machine.

The apparatus shown in the drawings is adapted for such multicolor presses as involve the use of a number of small form-cylinders placed operatively about a large impression-cylinder or for a number of forms attached to one large cylinder and printing against a small impression cylinder or cylinders. The apparatus I employ is substantially the same for both classes of forms, the differences being determined by size and weight and the effort to diminish necessary cost.

Figs. 1, 2, and 3 show a make-ready machine adapted for dealing with small forms, each of the latter on a cylinder of its own. 10 represents such a cylinder or an equivalent support for the form—that is to say, the form may have for a support its own form-cylinder taken out of the press, or a sleeve or body, as in Figs. 7 and 8, may be removed from its stock or axle in the press and fitted upon an identical stock or axle in the make-ready machine, or the form-plate 11 only may be dealt with on a dummy cylinder and may be removed after it is made ready and reattached to the form-cylinder in the press. In regarding Fig. 1 the last alternative may be assumed to avoid unnecessary description, the form-cylinder, though a dummy, being in configuration and size a duplication of that in the press, and I shall accordingly hereinafter speak of it or of any equivalent like it as a "form-cylinder" irrespective of its special construction. In this machine the large cylinder 12 plays a double part. It is a depressing-cylinder when the thick rubber blanket on the side 14 is used and an impression-cylinder when the hard packing between the bearers on the side 16 traverses the form. The cylinder 12 turns in bearings 18 in the heavy piece of framing 20, (see Fig. 4,) which oscillates at 22 in the main frame of the machine. The axis of the form-cylinder at 24, running in its bearings 25, is exactly parallel with that of the depressing-cylinder at 18 and always remains so, and it is brought forward with any desired pressure by means of the long wedges 26, actuated by the screws 28 and acting against the movable block 30. By substituting blocks of differing widths the contact of the form-plate and depressing-cylinder may be effectively made for form-cylinders differing considerably in diameter, and by removing the block 30 altogether the oscillating frame 20, with the depressing-cylinder, will fall back to the dotted position, so as to give free access to the form-cylinder 10, as indicated by the short arrow 31.

In using this apparatus for making a form ready the first step is to bend the flat form approximately to the curve of the cylinder 10 and hold it at one end by clamps or bolts of any suitable construction. The flat form for color-work usually consists of rolled zinc plate of considerable thickness which has had the design transferred upon it and etched into relief by an acid. Into the transferring and etching processes it is not necessary to go; but it should be explained that to bend successfully the large sheets of thick zinc that are used gives rise to many difficulties. These are due in the first instance to the harsh and stubborn nature of the metal zinc and to the fact that the etching and routing processes remove the metal in widely-varying quantities in the several parts of the plate, according to the design that is to be printed, whether open or close. The best precautions to insure a perfect flexure of the plate will be discussed later. For the present it is sufficient to say that with care and plenty of time the plate can be bent perfectly to the curve of the small form-cylinder in the machine described. To effect such a perfect bending of the zinc after the form-plate has been loosely lapped about the cylinder 10, the rubber-packed surface 14 of the depressing-cylinder is brought against it and first with a light pressure is made to traverse the zinc with a very slow motion by means of the winch-handle and gearing at 32. A larger block is then substituted at 30 and the rolling continued, and so with other blocks, the approach being rapid at first and very slow toward the end of the rolling-down process, when the successive depressions of the plate are exceedingly small. When the plate has in this way been depressed to close coincidence, its ends may be made fast alternately and the rolling down is continued to and fro, holding each end of the plate fast shortly before the depressing-cylinder reaches it. In this way and by using heavy pressure toward the end the under side of the plate is brought down to perfect coincidence with the surface under it, and a state of things is quickly reached which is much more slowly and imperfectly accomplished in the printing-press itself. This condition of the form must precede successful underlaying, which consists in pasting pieces of paper of the right size on the back surface of the plate, so distributed and of such thickness as will bring up the face to the true cylindrical contour, (accurate to within a very small fraction, say less than the one-thousandth of an inch,) which when achieved will always print well. In the printing-press this work had to be done under conditions that are never designed to facilitate it, in fact under conditions that increase its intrinsic difficulties for the sake of maintaining important advantages provided for the press as a printing-machine.

In following my make-ready process the next step is the examination of the form-surface with reference to underlaying. This is done in two ways—by printing an impression on paper and by actual measurement. To print in this machine under conditions that closely resemble those in the press into which the forms are ultimately to go, it is only necessary to ink the face of the relief-work lightly with a hand-roller of suitable size to hold a sheet upon the hard packing 16 by means of grippers or clamps at both ends, as at 34, on the impression side of the cylinder 12, then to approach the two cylinders into contact before beginning to print, and then by a rapid partial rotation of the geared cylinders applied by the winch-handle and gearing at 35 or in any other convenient way to cause the sheet to traverse the inked form. The appearance of such a proof, if it is carefully made, gives true information as to the condition of the printing-surface, and this proof is furthermore used to orient at the back the building up which is to be subsequently done there with superimposed pieces of paper. This is the only way when the work is done in the press by which information can be obtained as to the requirements of an under or over lay.

The second method of ascertaining the condition of the printing-surface is by measurements which may be made to give the thickness of metal of any spot on the form-plate. To accomplish this, the heavy steel bar 36 is connected by bolts with the frame of the machine, extending across from one side to the other and parallel to the axis of the form-cylinder. A caliper-gage 38, attached to a sliding clamp 40, is supported by the upper edge of the bar and may be held fast at any place, its axis being always in a plane passing through the axis of the form-cylinder below it. With the help of a gage so applied and made rigid or unyielding relatively to the frame 64 of the apparatus the most exact determinations can be made of those parts of the form-surface which are coincident with the true or normal printing-cylinder and of those parts that are low, and also the thickness of the necessary underlay may be ascertained that will be required to bring them up. In addition this gage is used to find out whether the form-plate is down solid upon the metal under it or whether further rolling down with the depressing-cylinder is necessary by simply forcing the gage down after its first contact and noting whether or not the form-plate yields. When after investigation with this thickness gage an underlay has been made, the plate must be again well rolled down to cause it to conform, after which a fresh impression may be taken against the hard packing on the impression-surface 16, and it may be a further examination and underlaying resorted to till conformity with the form-cylinder body and with the true printing-face is reached. To account for the imperfections which make underlaying necessary, it may be desirable to explain that the trouble is due chiefly to irregularities in the thickness of the metal of which the form-plate is made. When electrotypes or stereotypes are employed, undulations of surface are often due to imperfect finishing; but when zinc is the metal selected for the form, as it very often is, its irregularities in thickness are to be ascribed, first, to want of care in rolling during the process of its manufacture, and, secondly, to unequal treatment during the polishing process. A third cause of trouble is careless bending in the first instance, to which more specific reference will be made hereinafter.

Provision for effecting the adjustment to the proper position of the form-plate upon the form-cylinder or its equivalent in the make-ready machine with reference to the cylinder ends or bearers and with reference to a longitudinal plane through the cylinder axis and periphery is furnished by other gages. The screws 42 are used to maintain the proper position of the cylinder endwise as a whole. This is of much importance when a number of form cylinders or plates are to be registered in series; but the screws 42 may also be used to change the relative location of form-plate and the cylinder, when that is necessary after conformity has been reached, by strutting the plate from the frame temporarily in any convenient manner and causing the cylinder to slide under it by the action of the screws. The gage-points 44 are for circumferential measurements. They can be advanced and clamped and are also adjustable to suit all form-cylinders for ascertaining the identity of lateral distances between cross-marks and equivalent predetermined cross-lines from points on the etched designs for the several colors (in multicolor printing) which repeat themselves on each color-plate and therefore may be made to take the place of cross-marks. These gages are attached to clamps 46, that slide on the heavy steel bar 48, which is rigidly connected to the frame by the bolts 50. This bar being divided from the center outward and the sliding blades 52 being also divided enable the adjusted positions of the points 44 for any one form to be read off and recorded and comparison thereby facilitated of one form with that of the others printing in the same press or in different presses on the same sheet. With these gages also the inclination which any predetermined cross-line upon the surface of the form makes with a plane passing through one extremity of said line and the axis of the cylinder can be expressed and noted. In addition to these devices for measuring the straight-edge 56, which rests upon the clamps 46, is used for adjusting the ends of the form-plate or aiding when a diagonal adjustment is required.

In the foregoing nothing has been said of making ready with overlays, although my invention is especially adapted for such treatment of a form. This omission has been due to the fact that the description so far has had reference especially to certain chromatic presswork, which hardly admits of overlaying, because the form-cylinder does not return to the same place on the impression-cylinder or because all the forms return to the same place thereon.

When, as may frequently happen, a make ready by overlay is desirable, a tympan-sheet is fastened temporarily on the impression-surface 16 to receive the same, and the overlays are built up on it in the well-known way and with much greater convenience and advantage than is possible in any rotary press designed for printing purposes only. When successive proofs have shown the result to be satisfactory, the tympan-sheet (which is abundantly large) is removed and attached in register to the impression-surface of the press in which the form is to be worked.

The tympan-sheet may be attached in any usual way to the impression-surface of the printing-press, but must bear the same relation to the form-surface that it did in the make-ready machine.

In the apparatus for small form-cylinders just described 58 and 59 are the gears which connect the two cylinders, which are always brought together under definite relations— that is, as to the teeth that engage—whether 12 be used as a depressing or impression cylinder. This cylinder is shown with two gaps, which are convenient, but not essential, for its perimeter being abundantly large admits of having the reel-rod 60 outside, and clamping-grippers also. The main frame is marked 64 and the oscillating piece that carries the depressing-cylinder, of which an isolated perspective view is given in Fig. 4, is marked 20.

In Fig. 7 the ends of three sleeves are shown, these being indicated 66 67$^a$ 67$^b$. These sleeves are adapted to carry form-plates in the manner already referred to. By reason of their open sides such sleeves can be removed from the form-cylinder axles or stocks in the printing-press or in the make-ready machine and by suitable marks of registration can be easily adjusted to precisely the same relative position in either machine. The make ready may be effected by applying the form-plate to the sleeve in the make-ready machine and there making ready the form for printing, after which the sleeve and form can be transferred to the printing-press in the precise location desired for it, and the printing may at once proceed in said printing-press without any other making ready of the form.

In Fig. 8 a modified construction of a sleeve or body is shown in cross-section adapted to take a form-plate covering half its surface, and in Fig. 9 an axle therefor is shown in perspective, such as that which remains in the press and is likewise used to carry it in the make-ready machine. This body or sleeve has the advantage of going in and out of the press sidewise and not endwise, as is the case with the foregoing sleeves, which make necessary a special construction of the press-frame. It also goes on and off the axle 70 in Fig. 9 in like manner, which latter, as shown, may be regarded as a dummy axle for the make-ready apparatus and carries the gear and bearers.

To render possible the placing in position and subsequent removal of the body 68, I cut away on two opposite sides of the heavy shaft 70 two flats, (marked 72.) The body has a gap 74, which reaches to its hub, and the width between the two parallel jaws of this gap is exactly that between the two parallel flats on the sides of the shaft. It will readily be seen that in one position the cylinder-body can be dropped into place upon the shaft and that a quarter-turn will then secure it there still free until the screws at 76 have been tightened, when it will close upon the shaft and be held fast exactly as it will be subsequently in the printing-press. In this construction of the form-cylinder body other advantages are gained. Straining-bars, (the construction of which is well known,) as at 78 in the figure, and the counterpoising and balancing of the whole in the bearings at 25, Figs. 1 and 2, which often constitutes an important part of the work to be done in the make-ready apparatus and for which it is peculiarly fitted, are readily accomplished. The counterpoising consists simply in attaching small weights to the light side in any suitable way, as at 79 in Fig. 8, where the weights are held by small bolts.

When the forms that are to be made ready go upon a form-cylinder of large diameter, the apparatus I employ changes its appearance, but not its intrinsic character. In Fig. 5 the segment 80 carries the form-plate 11, to which the latter may be bolted at its ends or clamped, as with the movable clamp 82, so as to allow of some movement in each direction during the rolling-down process. The segment 80, which, like cylinder 10, is provided with bearers, is counterpoised by the lead weight 84, and the whole swings on a stiff axle in the bearings 86. This segment not only represents the form-cylinder in the press on which the form-plates are to go, but it actually is a dummy cylinder from which the useless part has been cut away to save weight and cost and to facilitate very greatly the handling of the plate at the ends. The cylinder 88 in this machine corresponds with cylinder 12 in that already described and, like cylinder 12, carries bearers. It represents approximately in size the impression-cylinder in the printing-press to which it is related, and to maintain like conditions in the production of proofs it is desirable it should do so. It is made to serve for that purpose and for rolling down the zinc plate as well by removing the harder packing as a whole and substituting a rubber blanket therefor. This substitution, though it involves some trouble, is desirable to prevent the injury which the back of the rubber blanket would do the impression-cylinder packing under heavy rolling pressure and the disturbance of the pitch-line. To facilitate the application and initial bending of the form-plate, the depressing-cylinder 88 is lifted high off the segment by the strong spring 90 as soon as the screws 92 are relaxed. The method of rolling down in this apparatus is precisely like that already described for small form-cylinders. It is not, however, so necessary to hold the ends of the plate in the first instance, as after the initial bending the plate accommodates itself to the large curve and may often with advantage be rolled down from the middle toward each end, the clamps themselves allowing of a little elongating movement as the plate lies down upon the support 80. The several form-gages fixed to this machine are exactly like those already described and are marked with the same reference-numbers. This make-ready apparatus differs from that for forms of small diameter chiefly in the double use that is made of the one contact-surface for depressing and for proving purposes. This is done and is so shown in the drawings because the saving in the cost of construction is probably sufficient to counterbalance the inconvenience of changing the packing, &c. On theoretical grounds it might be better to provide two cylinders, one for depressing and one for proving purposes, and retain the proper packing on each; but to do so would not only add considerably to the cost of the machine, but also to its complexity and therefore to the difficulties of its manipulation.

In the foregoing reference has been made to the care necessary in bending the form-plate, especially when it is composed of zinc, which for multicolor printing it very often is. This arises from the fact that unless time enough is allowed the molecules in a piece of sheet metal to rearrange their internal relations when required to flow upon each other they may yield suddenly where the strain at the moment is greatest and give rise to sharper bends than are desired, which are gotten rid of with great difficulty afterward, proving, indeed, in bad cases wholly unmanageable. This is true of all metals, but especially of zinc, for when a sheet of zinc—say one-eighth of an inch thick—is etched into high relief and when part of the surface consists of large solid places or another part of a few delicate lines in any direction standing alone and high above the general surface then the difficulty of accomplishing the initial flexure of the plate with the necessary uniformity is greatly increased, and although with time and care the bending of plates can be done from first to last in the manner already described still with a view to safety and the saving of time I prefer to begin this important operation by means that are very perfectly under control and in special apparatus, so as to secure the best result most quickly and with the least labor and risk.

To increase the ductility of the form-plate for the time being and cause it to bend more readily, the temperature may be raised. This is especially efficacious when sheet-zinc is the metal to be operated upon, because at a very moderately-increased heat its resistance to flexure is greatly diminished. In Figs. 1 and 2 a number of gas-burners 110, fed by the pipe 112, are shown, which may be employed for this purpose. As the form is made to pass over these flames the zinc of which it is composed may be made sufficiently warm to have its ductility and flexibility greatly increased. The temperature should never be raised high enough to soften the metal to its maximum nor so high as to affect the rubber or felt blanket that protects the face. It is best accomplished when a non-conducting stratum of paper or cloth is interposed between the plate and its support, the rolling-down process following then quickly upon the heating. The application of heat for my purpose is efficacious, because it vastly increases the molecular activity of the substance and makes the yield of the plate, as well as the diminution of elasticity, much greater; but it should be remembered that the final advantage gained by heating the form-plate in any of the bending operations I have described consists, chiefly, in a saving of time, for at ordinary temperatures the same results can be achieved, and in this respect the advantage is experienced most when the plate is very nearly rolled down—that is, when the remaining final movement desirable is a very small one—so that as a general rule the increments of heat should be successively added during the bending of a plate, just as the increments of force upon it are increased through the gradual approach of the depressing-cylinder. Under these conditions and when an increased temperature of the plate is resorted to conjointly with heavy pressure it may become desirable to substitute a blanket of thick felt or analogous material for the rubber, as the former will reach the low parts of the plate and will not stick.

In rolling down generally it is important that the pressure exerted by the depressing-cylinder should affect and be applied to the plate itself as a whole and not to the surfaces only that are in relief. This is accomplished when the blanket or packing is thick enough and soft enough to reach the bottom of the etched spaces and press upon them without exerting a very much greater pressure upon the elevated parts. Then the whole plate is bent together, whether or not the successive parts passing under the depressing-roller be thick or thin, and, as I have suggested above, these facts should be taken especially into account when by the application of heat the delicate parts of the work standing alone are softened even to a slight extent.

From what has been said it will be seen that my method of making ready away from the press involves much more accurate work and supplies the means therefor than it was possible to acquire by the old well-known method and that this is due to the fact that the make-ready apparatus is designed solely for the one purpose in view, whereas in the press the objects are many, having to do with feeding, printing, inking, delivery, and general manipulation, &c., among which making ready is but an incidental though necessary part of the work. Making ready for ordinary book-printing, even when cutwork is included, is not infrequently a difficult operation; but it is nothing as compared with the like process for color-work, when each plate may contain six or seven square feet of surface and when it has to register exactly with four or five other like plates, each printing a different color. Making ready under such circumstances is beset with difficulties familiar to those who are conversant with the art. My invention provides room and an easy position for the workman and the means also which enable him to prepare one job for the press in which another is being printed, and thereby accomplish the saving of much valuable time.

When the form is made ready on a movable cylinder, which cylinder is transferred from the make-ready machine to the printing-press, it is only necessary that the cylinder be made to assume in the press the same relation to the impression-surface that it had in the make-ready machine. This requires no special care beyond the proper placing of the parts in position, for, as has been before stated, the form-cylinder in the make-ready machine is either the same or a facsimile of the form-cylinder used in the printing-press, and of course it will be understood that the same relation of printing-surface to impression-surface must be maintained in the printing-press as in the make-ready machine.

Where the form only is removed from a dummy or facsimile cylinder in the make-ready machine to the real cylinder in the printing-press the form may be secured to the cylinder by any usual means. The location of the said form on the printing-cylinder in correspondingly identical location to the location occupied on the dummy or facsimile cylinder is merely a matter of measurement. All practical printing-machines are provided with means for holding the forms thereon and usually with means for adjusting such forms laterally to secure a perfect register. My invention relates not specially to the improvements in printing-presses, save as such presses are adapted for the easy reception of forms or tympans elsewhere prepared, but contemplates a performance of a part of the work which has heretofore been done on a printing - machine — namely, the "making ready" (a term well understood by printers) on a separate or auxiliary machine under more favorable conditions and the transference of the make-ready impression-surface or underlaid form to the press proper to continue the work of printing.

In the patent to Russell, No. 347,256, of August 10, 1886, apparatus is provided whereby duplicate plates may be adjusted laterally to identical or corresponding positions, thus securing accurate register.

While accurate register must be had to secure the results of my invention the accuracy of register is not the important feature of my invention. Accurate register may be attained in many ways known to printers. Register is attained usually by lateral or circumferential adjustment of the form in the press. I make like adjustment under the most favorable conditions in the make-ready machine and the same are thus copied mechanically in the press itself. A complete make ready involves much besides register. It is more essentially the adjustment of the several parts of the plate-form when put in its right place and solidly supported in a vertical or radial direction, and, when necessary, of the several parts of the impression-surface toward the corresponding parts of the form-surface making contact therewith as well, so as to secure a perfect impression of the sheet of paper to be printed by determining the right pressure at every part of the design on the two surfaces.

The methods and devices described in the foregoing are the best known to me for the accomplishment of the ends in view; but I do not wish it understood that I confine myself to them exclusively, as it is obvious that they admit of modification and of the substitution of equivalent devices without affecting the principles underlying my invention.

As an alternative method of heating form-plates more manageable in many cases than the gas-flames referred to in the foregoing, steam, and especially hot air at a very high temperature, should be cited as giving very satisfactory results, and it should also be stated that quite irrespective of the increase of plasticity due to heating a zinc plate such treatment is in itself an annealing process which is most favorable in its effects in overcoming the persistent elasticity of the metal, even after it has cooled, and may be used advantageously on the form-plate with that end in view while in or out of the make-ready machine.

It should be understood that my invention contemplates an intimate relation between the make-ready machine on which the forms are prepared for printing and the printing-press on which the sheets are actually printed, for the make-ready machine must have the exact equivalent or counterpart of the form-support and the impression-surface of the press proper, or the make ready cannot be properly effected in the make-ready machine. The make-ready machine will preferably have as little mechanism as is feasible in order that ready access can be had to the form for the purpose of preparing the same.

For the purposes of this invention I do not contemplate changes in printing-presses in their functional character, but merely such slight structural change as will give facility in applying forms in the press in the exact position necessary to secure the same relation between form and impression surface that obtained in the make-ready machine. Many presses as now constructed are adapted to receive forms or cylinders from my make-ready machine without any change whatever.

What I claim is—

1. In a machine for making ready outside the printing-press, a form-cylinder held and turning in suitable bearings, with means for attaching the form thereto and holding it in place, with gages connected to the frame for examining and testing the form-surface as to the coincidence of all its parts with a true cylindrical surface, whereby the necessity for and extent of underlaying and like changes may be determined by measurement, substantially as described.

2. In a machine for making ready outside the printing-press, a form-cylinder held and turning in suitable bearings; with means for attaching the form thereto and for holding it in place; with gages connected to the frame of the machine, for examining and testing the form-surface as to its coincidence with a true cylindrical surface, and the angular relation of any predetermined cross-line thereon to a plane through the cylinder-axis, whereby measurements affecting the right position of the printing-surface and its relation to other printing-surfaces may be made and recorded, substantially as described.

3. In a machine for making ready outside the printing-press, a form-cylinder held and turning in suitable bearings, with gages connected to the frame of the machine and adapted for the detection of departures from the proper height of parts of the form; with means for oscillating the form-cylinder about its axis, and with a cylindrical impression-surface on an axis parallel to the form-cylinder, and with means for approaching the form-cylinder and impression-surface, substantially as described.

4. A machine for making ready outside the printing-press, consisting of the following elements; a form-support carrying the form to be made ready, a frame provided with bearings for the form-support, and bearings for a swinging pressure-frame; with bearings in the latter for a cylinder-axis, with a depressing-cylinder on such an axis and carrying an impression-surface; with means for adjusting said pressure-frame, and with form-gages connected to the frame of the machine, substantially as described.

5. In a machine for making ready outside the printing-press, a cylindrical form-support identical as to form capacity with the corresponding portion of the form-cylinder in the printing-press, means for retaining a form on said form-support, gages supported from the frame and adjustable to various positions to determine the required form adjustment to produce a true cylinder, and means for forcing such form to or toward such cylinder shape, substantially as described.

6. In a machine for making ready outside the printing-press, a cylindrical form-support identical with the corresponding form-support of the printing-press; a cylindrical depressing-surface on an axis parallel to the axis of the form-support; and means for approaching the depressing-surface and the form-surface toward each other, while permitting a yield under excessive resistance, substantially as described.

7. In printing machinery, a cylindrical form-support and means for holding the same outside the printing-press, and means for indicating the relation of form-surface to impression-surface while on this support outside the press, so that the form may be made ready outside the printing-press and transferred with its support thereto, substantially as described.

8. In printing machinery, a cylindrical form-support, a tympan-support in operative relation thereto outside the printing-press and means for indicating the relation of said parts, so that the tympan may be made ready outside the printing-press and transferred thereto, substantially as described.

9. In a machine for making ready outside the press, a cylindrical form-support and a cylindrical tentative impression-cylinder having a surface sufficiently compressible to receive form elevations and to extend into the depressions of the form, and means for approaching the form and impression-surface while permitting yielding under excess of resistance, substantially as described.

10. In a machine for making ready forms outside the printing-press, a form-cylinder and means for holding the forms thereon, and a depressing-cylinder having its axis parallel with the form-cylinder, and having a portion of its circumference impression-surface and a portion of its circumference form-depressing surface, and means for approaching the form and impression cylinders into closer proximity to adjust action on the form.

11. In a make-ready apparatus, the segmental form-support, the movable gage in the described relation thereto, and the depressing-cylinder whereby the form may be compressed on its support, all combined substantially as described.

12. The improvement in the art of making ready forms for printing, which consists in applying a curved form-plate to a make-ready machine having a facsimile of the form and impression surfaces of a rotary printing-press, but omitting other usual appliances of the printing-machine, ascertaining by trial and measurement the desirable changes in elevation of the form-surface, changing the elevation of said form-surface by underlays and by pressure in the make-ready machine, and transferring the prepared form to the rotary printing-machine in the same relative position as in the make-ready machine, substantially as described.

13. The improvement in the art of making ready printing-forms, which consists in applying a curved form-plate to a make-ready machine having form and impression surfaces facsimiles of the corresponding surfaces of a printing-press, ascertaining by trial and measurement the desirable changes in impression-surface in the make-ready machine, preparing said impression-surface by overlays, and transferring the form and impression surface to the same relative position in the press which they occupied in the make-ready machine, substantially as described.

14. The improvement in the art of making ready printing-forms, which consists in applying a curved form-plate to a make-ready machine with form and impression surfaces the facsimiles of corresponding surfaces in the press, and changing the surface projection by compression between said form and impression surfaces, the impression-surface being covered with an elastic packing which extends to the bottom of the depressions in the form-plate, ascertaining the necessary changes in thickness of form by trial, correcting the thickness by underlays, and transferring the form so made ready to a like relative position in the printing-press, substantially as described.

15. The improvement in the art of making ready metallic forms which consists in placing the form in the same relation to an impression-surface that it will occupy when in the press, ascertaining the changes necessary to properly "make ready" the form, making ready, and finally transferring to the press.

JOHN W. OSBORNE.

Witnesses:
   CHAS. F. DU BOIS,
   CHAS. E. LANNING.